(12) United States Patent
Stojkovic et al.

(10) Patent No.: US 9,434,422 B2
(45) Date of Patent: Sep. 6, 2016

(54) GEOMETRIC/MECHANICAL ISOLATION OF ALUMINUM TO STEEL JOINING AT TRIM EDGES FOR CORROSION PROTECTION

(71) Applicant: FORD GLOBAL TECHNOLOGIES, LLC, Dearborn, MI (US)

(72) Inventors: Dragan B. Stojkovic, Taylor, MI (US); Colleen Marie Hoffman, Canton, MI (US); Kimberly Ann Lazarz, Ypsilanti, MI (US); Jack Lashbrook, Garden City, MI (US); Chris Verschaeve, St. Clair Shores, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 368 days.

(21) Appl. No.: 14/195,898

(22) Filed: Mar. 4, 2014

(65) Prior Publication Data

US 2015/0251706 A1  Sep. 10, 2015

(51) Int. Cl.
*B62D 27/02* (2006.01)
*B62D 27/06* (2006.01)
*F16B 5/02* (2006.01)
*F16B 33/00* (2006.01)

(52) U.S. Cl.
CPC ........... *B62D 27/023* (2013.01); *B62D 27/065* (2013.01); *F16B 5/02* (2013.01); *F16B 33/008* (2013.01); *Y10T 29/49622* (2015.01); *Y10T 403/25* (2015.01); *Y10T 403/74* (2015.01); *Y10T 403/75* (2015.01)

(58) Field of Classification Search
CPC .......................... Y10T 403/75; B62D 27/023
USPC .............. 296/29, 205; 403/408.1, 373, 374.3
See application file for complete search history.

(56) References Cited

U.S. PATENT DOCUMENTS

| | | | | |
|---|---|---|---|---|
| 5,433,501 A | * | 7/1995 | Thomas | B62D 33/04 105/409 |
| 6,389,697 B1 | * | 5/2002 | Benoit | B21D 26/14 219/617 |
| 6,394,537 B1 | * | 5/2002 | DeRees | B62D 29/048 296/191 |
| 6,692,065 B2 | * | 2/2004 | Yamamoto | B62D 25/02 296/146.9 |
| 7,828,357 B2 | * | 11/2010 | Hayashi | B23K 11/115 296/29 |
| 7,871,123 B2 | * | 1/2011 | Stojkovic | B62D 25/04 296/193.09 |
| 8,262,155 B2 | * | 9/2012 | Leanza | B62D 27/02 296/187.01 |

(Continued)

FOREIGN PATENT DOCUMENTS

| | | |
|---|---|---|
| DE | 10149178 A1 | 10/2000 |
| DE | 10350885 A1 | 10/2003 |

*Primary Examiner* — Joshua J Michener
*Assistant Examiner* — Matthew Gitlin
(74) *Attorney, Agent, or Firm* — Jason Rogers; Price Heneveld LLP

(57) ABSTRACT

A joint for a motor vehicle body comprises a first structural member fabricated from aluminum attached to a second structural member fabricated from steel. The second structural member has an adjoining portion that is in substantially juxtaposed abutting relation with the first structural member when the second structural member is attached to the first structural member. The second structural member has a ramp portion terminating in a bare exposed edge on the second structural member and upon which the bare exposed edge is disposed. The bare exposed edge is displaced from the first structural member to form a gap between the first structural member and the bare exposed edge to prevent corrosion of the bare exposed edge without the use of adhesives and sealants.

20 Claims, 4 Drawing Sheets

(56) References Cited

U.S. PATENT DOCUMENTS

| | | | |
|---|---|---|---|
| 8,414,087 B2* | 4/2013 | Wibbeke | B60G 7/001 301/124.1 |
| 2002/0050064 A1* | 5/2002 | Furuse | B62D 23/005 29/897.2 |
| 2004/0150242 A1* | 8/2004 | Heilmeier | B62D 21/11 296/29 |
| 2005/0046215 A1* | 3/2005 | Chung | F16F 1/3814 296/29 |
| 2015/0137561 A1* | 5/2015 | Kuepper | B62D 25/025 296/209 |

* cited by examiner

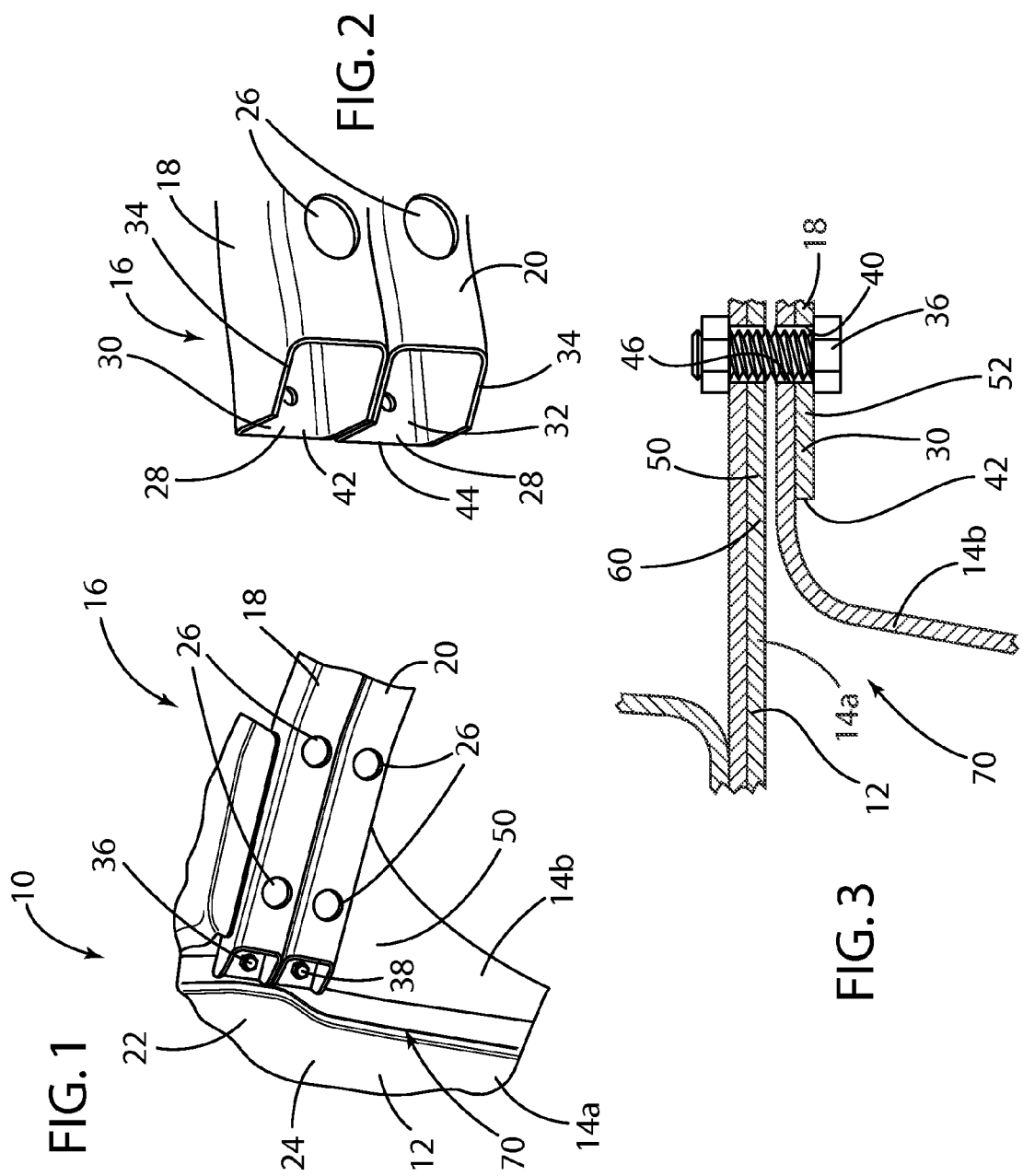

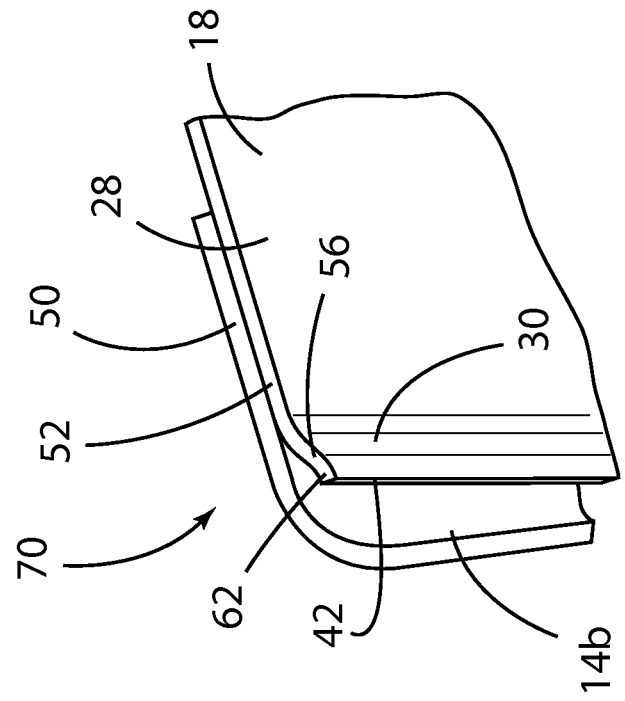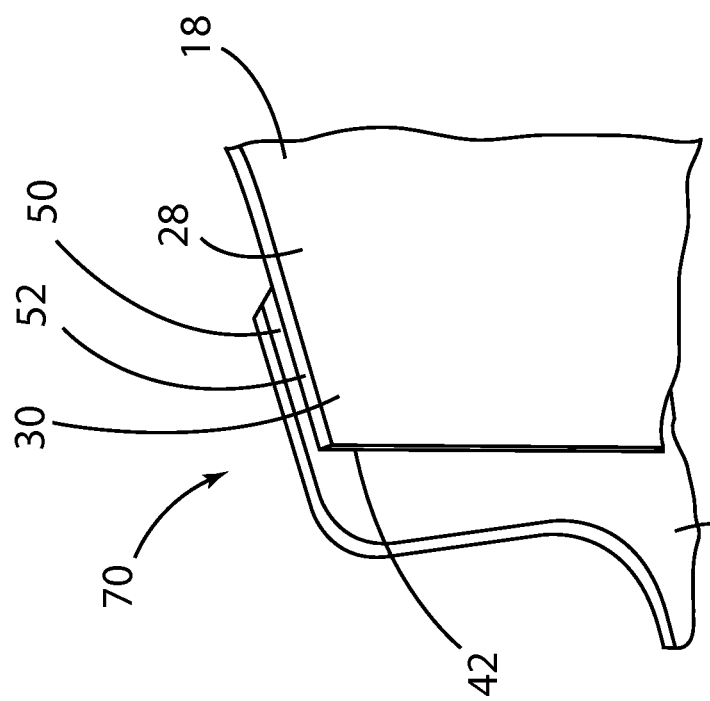

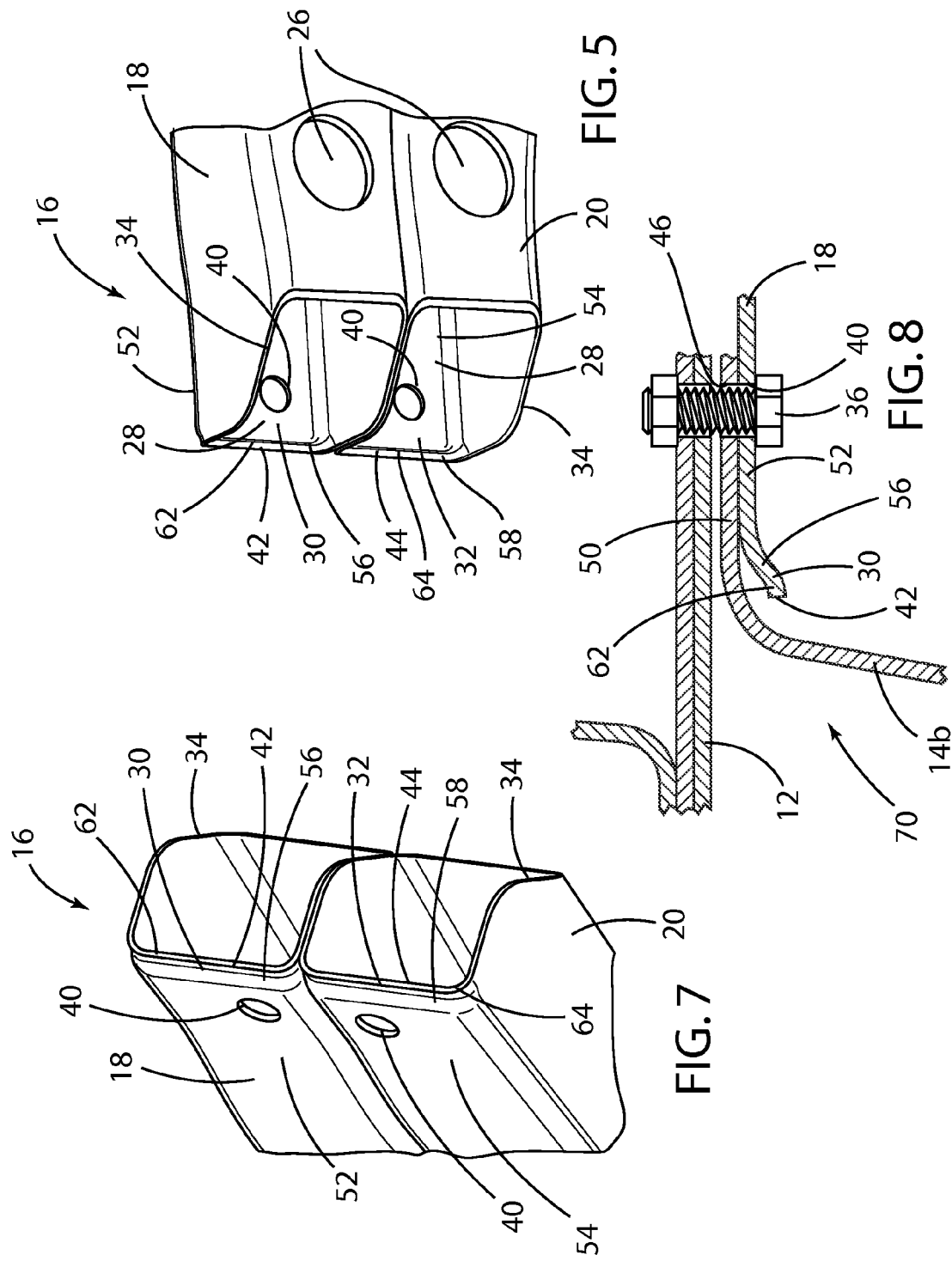

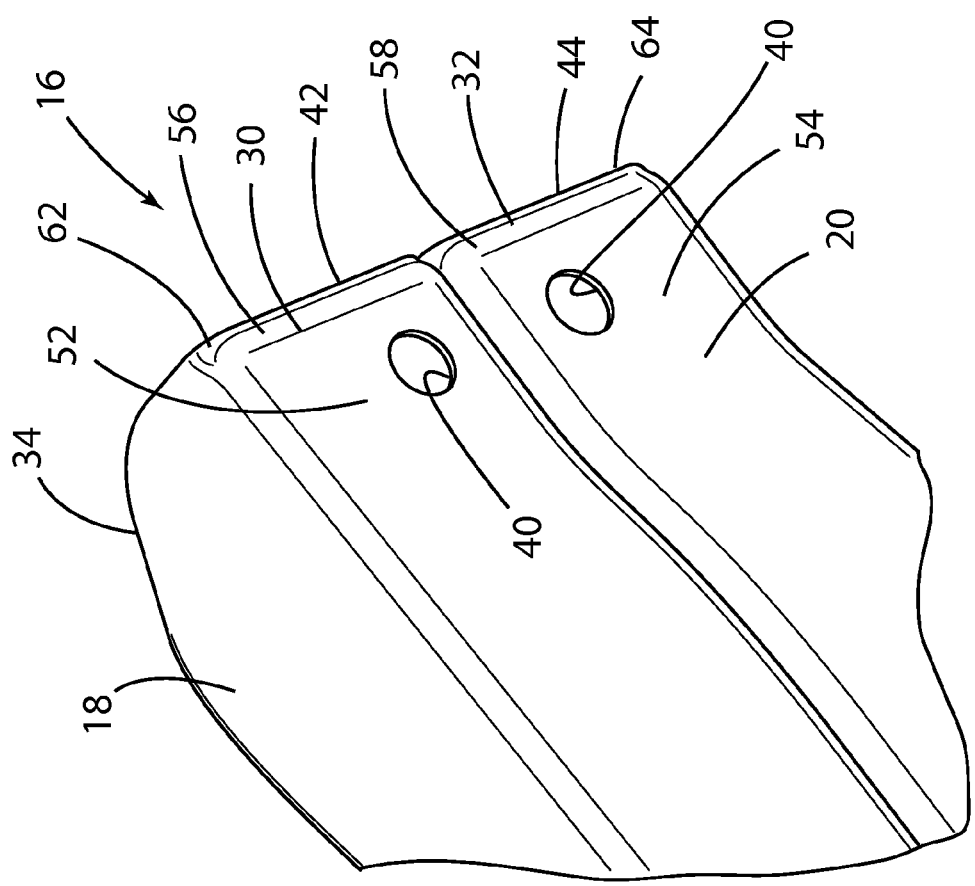

GEOMETRIC/MECHANICAL ISOLATION OF ALUMINUM TO STEEL JOINING AT TRIM EDGES FOR CORROSION PROTECTION

FIELD OF THE INVENTION

The present invention generally relates to joining structural members comprising different metals, in particular, a joint comprising a hydroformed steel tube attached to an aluminum substrate that provides improved corrosion protection and a method for joining the same.

BACKGROUND OF THE INVENTION

Body construction design is always problematic in regions where two different metals are joined, in particular, regions where galvanic corrosion is likely to occur. Galvanic corrosion can occur if a large thermodynamic potential difference exists between two metals, for example, between aluminum and steel. Many steel coatings have been developed over the years to lower the thermodynamic driving force when aluminum is in contact with steel, such as aluminized coatings, hot dipped galvanized, or electro galvanized. The zinc or aluminum coatings effectively seal off the steel surface and lower the galvanic difference, as zinc or aluminum coatings are closer in thermodynamic potential to aluminum than steel. These coatings are applied at the rolling mill and coat the top and bottom surfaces of the steel.

However, during subsequent processing, where the steel rolls are cut and blanked into specific shapes prior to stamping, the resulting bare exposed edges of the steel blanks are not protected by these coatings. Once these blanks are formed into usable structures and components and placed into service, where they may be exposed to the elements, the uncoated and bare exposed edges of the steel structures and components are vulnerable to attack by electrolytes, such as salt and water, particularly where the steel structures and components are mounted to aluminum structures. Hence, a solution that addresses these concerns would be advantageous.

The solution disclosed herein is a geometric and mechanical separation between the aluminum and the bare exposed edges of the steel structures of the tubes/stampings. In particular, a joint is disclosed that comprises an aluminum member attached to a steel member having an adjoining portion in substantially juxtaposed abutting relation with the aluminum member, the steel member having a ramp portion terminating in a bare exposed edge, the ramp portion being displaced from the aluminum member to form a gap between the aluminum member and the bare exposed edge to prevent corrosion of the bare exposed edge without the use of adhesives and sealants.

Thus, the solution presented by the present joint for a motor vehicle body is a relatively low-cost, light-weight structure that protects the respective aluminum and steel components from corrosion.

SUMMARY OF THE INVENTION

According to one aspect of the present disclosure, a joint for a motor vehicle body comprises a first structural member fabricated from aluminum attached to a second structural member fabricated from steel. The second structural member has an adjoining portion that is in substantially juxtaposed abutting relation with the first structural member when the second structural member is attached to the first structural member. The second structural member has a ramp portion terminating in a bare exposed edge on the second structural member and upon which the bare exposed edge is disposed. The bare exposed edge is displaced from the first structural member to form a gap between the first structural member and the bare exposed edge to prevent corrosion of the bare exposed edge without the use of adhesives and sealants.

Still another aspect of the present disclosure is a joint for a motor vehicle body where the first structural member is a component of a motor vehicle body.

Yet another aspect of the present disclosure is a motor vehicle body joint where the second structural member is a hydroformed tube and wherein the bare exposed edge is disposed on a terminal portion of the ramp portion at a distal end of the hydroformed tube.

An additional aspect of the present disclosure is a motor vehicle body joint where the hydroformed tube comprises aluminized coated high strength steel and the bare exposed edge is formed by cutting the hydroformed tube prior to attachment to the first structural member.

Another aspect of the present disclosure is a motor vehicle body joint where the second structural member comprises a pair of a hydroformed tubes and wherein each of the pair of hydroformed tubes has a ramp portion terminating in a bare exposed edge that forms a distal end of each of the pair of hydroformed tubes of the second structural member. The ramp portion of each of the pair of hydroformed tubes having a terminal portion displaced from the first structural member to form a gap between the first structural member and each of the bare exposed edges to prevent corrosion of the bare exposed edge without the use of adhesives and sealants.

Still another aspect of the present disclosure is a motor vehicle body joint where a pair of hydroformed tubes each form a substantially rectangular cross-sectional tube and each further comprises an adjoining portion that is in substantially juxtaposed abutting relation with the first structural member wherein the second structural member is attached to the first structural member and wherein each of the pair of hydroformed tubes is arranged in substantially juxtaposed abutting relation one to the other proximate the adjoining portion of each of the hydroformed tubes.

A further aspect of the present disclosure is a motor vehicle body where the gap prevents water accumulation in the joint arising from capillary action.

Yet a further aspect of the present disclosure is a motor vehicle body joint where the gap is at least 3 mm.

An additional aspect of the present disclosure is a motor vehicle body joint where the first and second structural members each have at least one opening in alignment with one another and through which a threaded fastener extends to attach the first structural member to the adjoining portion of the second structural member.

Yet another aspect of the present disclosure is a motor vehicle body joint where the first structural member has a substantially planar portion and the adjoining portion of the second structural member is substantially co-planar with the first structural member and where the ramped portion terminates with the terminal portion that places the bare exposed edge in parallel relationship with the first structural member.

A still further aspect of the present disclosure is a motor vehicle body joint where the hydroformed tube forms a substantially rectangular cross-sectional tube and where the bare exposed edge is formed by cutting the hydroformed tube at an oblique angle relative to the tube prior to attachment to the first structural member.

Another aspect of the present disclosure is a motor vehicle body joint where the oblique angle is about 45 degrees.

A yet additional aspect of the present disclosure is a joint comprising an aluminum member attached to a steel member having an adjoining portion in substantially juxtaposed abutting relation with the aluminum member. The steel member has a ramp portion terminating in a bare exposed edge, the bare exposed edge being displaced from the aluminum member to form a gap between the aluminum member and the bare exposed edge to prevent corrosion of the bare exposed edge without the use of adhesives and sealants.

A further aspect of the present disclosure is a joint where the ramp portion extends away from the aluminum member at an angle of at least 30 degrees.

Still another aspect of the present disclosure is a method of forming a joint for a motor vehicle body, the method comprising the steps of fabricating a first structural member fabricated from aluminum metal, fabricating a second structural member from steel metal having an adjoining portion and a ramp portion terminating in a bare exposed edge on the second structural member and upon which the bare exposed edge is disposed, and attaching the second structural member to the first structural member, wherein the adjoining portion of the second structural member is in substantially juxtaposed abutting relation with the first structural member wherein the second structural member is attached to the first structural member and the bare exposed edge is displaced from the first structural member to form a gap between the first structural member and the bare exposed edge to prevent corrosion of the bare exposed edge without the use of adhesives and sealants.

A yet additional aspect of the present disclosure is a method of forming a second structural member, the method comprising a hydroformed tube that forms a substantially rectangular cross-sectional tube, forming the hydroformed tube with the ramp portion at a distal edge thereof, wherein the ramp portion has a terminal portion upon which the bare exposed edge is disposed.

Still another aspect of the present disclosure is a method of forming a joint for a motor vehicle body, wherein the gap is at least 3 mm.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a top perspective view of a portion of a motor vehicle body assembly incorporating the motor vehicle body joint in accordance with the present disclosure;

FIG. 2 is a top perspective view of a second structural member in accordance with the prior art;

FIG. 3 is a cross-sectional view of a motor vehicle body joint in accordance with the prior art;

FIG. 4. is a top perspective view of the first and second structural members in accordance with the prior art;

FIG. 5 is a top perspective view of a second structural member in accordance with the present disclosure;

FIG. 6 is a bottom rear perspective view of the second structural member in accordance with the present disclosure;

FIG. 7 is a bottom front perspective view of the second structural member in accordance with the present disclosure;

FIG. 8 is a cross-sectional view of a motor vehicle body joint in accordance with the present disclosure; and FIG. 9 is a perspective view of the first and second structural members in accordance with the present disclosure.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Motor vehicles 10, as is known, are constructed from a multitude of components attached one to the other to create a highly intricate and sophisticated piece of machinery. In particular, modern motor vehicles 10 utilize integrated body structures 12 formed from a number of interconnected individual body panels 14a, 14b. Such body panels 14a, 14b are commonly stamped out of rolls of relatively thin metal to form a blank and then typically progressively pressed into their final shape using machine presses for stamped sheet metal parts. The parts so stamped are then arranged in their proper configuration and are often welded or fastened together in order to form relatively highly complicated body structures 12. For example, one such body structure 12 is that of the cab 24 of a pickup truck that is used to enclose the passenger compartment.

Particularly as applied to motor vehicles 10, there has been a trend toward fabricating such body structures 12 from lighter materials, such as aluminum sheet metal components, as shown in the cab body structure in FIG. 1, in order to reduce weight and offer improved corrosion resistance. Aluminum has one-third the weight of steel. Aluminum blanks can also be formed into complex shapes, are amenable to certain welding procedures, and can be readily joined together through fasteners.

At the same time, there has been a trend toward the use of front rail assemblies 16 fabricated from hydroformed steel tubes. Such hydroformed tubular front rail assemblies 16 provide support and rigidity onto which the engine, transmission, and front suspension (not shown) can be mounted, as well as to which front end body panels (not shown) may be attached. Preferably, the hydroformed tubular front rail assemblies 16 comprise, in one example, a pair of hydroformed upper and lower tubular support rails 18, 20 that are positioned in juxtaposed relationship with one another. An upper tubular support rail 18 extends from the lower portion 22 of the front of the cab 24 forward to provide an attachment location for the front body panels and other front end structures, such as the radiator support, bumper, and front fascia. A lower tubular support rail 20 similarly extends from the lower portion 22 of the front of the cab 24 forward, but then is directed inwardly to form the cradle for the engine and structuring mounting for the suspension components. Preferably, the hydroformed upper and lower tubular support rails 18, 20 are joined one to the other proximate the cab 24, for example, by welding, to form a pair of joined hydroformed tubes. When so joined, in a substantially juxtaposed abutting relation one to the other, the pair of hydroformed upper and lower tubular support rails 18, 20 provides additional structural rigidity to the front of the motor vehicle 10.

Each of the hydroformed upper and lower tubular support rails 18, 20 preferably comprises a hydroformed steel tube that is substantially rectangular in configuration with a relatively generous diameter corner at each corner, as shown in the Figures. Each of the hydroformed upper and lower tubular support rails 18, 20 preferably has a series of openings 26 along its length that allow for reduction in weight, as well as access for additional fasteners (not shown) that may extend through an inside wall 28 of each of the upper and lower tubular support rails 18, 20 through which a fastener can be attached. As is well-known, the hydroformed upper and lower tubular support rails 18, 20 have a complicated, arcuate shape and are preferably provided with an aluminized coating to provide protection against corrosion. At each of the distal ends 30, 32 of the upper and lower tubular support rails 18, 20, there is an oblique cut 34 that provides access to the upper and lower fasteners 36, 38 that are used to attach each of the distal ends 30, 32 of the upper and lower tubular support rails 18, 20 through an opening 40 in the aluminum sheet panel 14 and a corresponding opening 46 in at least one of the upper and lower tubular support rails 18, 20. Preferably, the aluminum body panel 14 and each of the upper and lower tubular support rails 18, 20 have at least one respective opening 40, 46 in alignment with one another and through which one of threaded fasteners 36, 38 can be inserted and secured in place to attach the adjoining portion of the upper and lower tubular support rails 18, 20 to the aluminum body panel 14. Also, preferably, the oblique cut 34 is about 45 degrees. Further, as noted below, after the coating is applied, the parts are blanked in the specific shapes prior to stamping, which also leaves bare exposed edges 42, 44 at the end of each upper and lower tubular support rails 18, 20 at the oblique cut 34.

The bare exposed edges 42, 44 of the upper and lower tubular support rails 18, 20 are shown in FIGS. 1-4 in immediately adjacent relation to an aluminum body panel 14 of the cab 24. As described above, a prime location for galvanic corrosion has been found to exist at this juncture, particularly in view of the fact that the bare exposed edges 42, 44 is immediately adjacent an aluminum body panel 14b. The juxtaposition of aluminum and steel components tends to create a galvanic corrosion that, over time, will degrade the strength and integrity of the components and result in a loss of the joint. That is, galvanic corrosion can occur if large thermodynamic potential differences exist between two metals, for example, aluminum and steel.

One solution has been to coat the steel component to lower the hydrodynamic driving force when the two dissimilar metals are in contact. For example, aluminized coatings, hot dipped galvanized, or electro galvanized coatings could be applied to the steel component. The aluminum or zinc coatings thus replace the steel surface, also lowering the galvanic difference since they are lower in potential to aluminum than steel. However, these coatings are applied at the rolling mill and coat the top and bottom surfaces of the steel. When the parts are cut, that is blanked, into specific shapes prior to hydroforming, the bare exposed edges of the blank may not be protected by these coatings. Moreover, even after the hydroforming process, the hydroformed upper and lower tubular support rails 18, 20 must often be cut or trimmed to properly form the distal ends 30, 32 of the hydroformed upper and lower tubular support rails 18, 20. As a consequence, once the hydroformed upper and lower tubular support rails 18, 20 are placed into service and attached to the aluminum cab structure 12, for example, where they may be exposed to the elements, the uncoated and bare exposed edges 42, 44 of the distal ends 30, 32 of the steel hydroformed upper and lower tubular support rails 18, 20 is vulnerable to attack by the electrolytic reaction between salt and water where capillary water tension causes moisture to provide a bridge and effectively close the electrical circuit between the bare exposed steel edge 42, 44 and the adjacent aluminum panel.

Other solutions have included the use of adhesives, sealers, patches, and waxes in attempts to seal the bare exposed steel edge 42, 44 and prevent water bridging to the aluminum. However, these solutions tend to add cost and operational steps, and have seen limited success in resolving the problem.

Referring to FIGS. 5-9, a joint 70 for a motor vehicle body 12, comprising a first structural member fabricated from aluminum attached to a second structural member fabricated from steel in accordance with the disclosure presented herein, is shown. More particularly, a joint 70 between the aforementioned cab 24 and the hydroformed steel upper and lower tubular support rails 18, 20 is presented. Preferably, the location for the joint 70 is positioned on a substantially planar portion 50 of the uncoated aluminum body panel 14b, preferably having a nominally thickness of 2.2 mm. The hydroformed upper and lower tubular support rails 18, 20 are preferably formed from high strength, low alloyed grade 350 steel having a nominal thickness of 1.5 mm, coated with an aluminized A3 powder coating. The hydroformed upper and lower tubular support rails 18, 20 are further preferably each provided with an adjoining portion 52, 54 that is in substantially juxtaposed abutting relation with the planar portion 50 of the uncoated aluminum body panel 14b of the cab 24 when the hydroformed upper and lower tubular support rails 18, 20 are attached to the aluminum body panel 14b and a ramp portion 56, 58 that curves away from an inner wall 60 of the aluminum body panel 14b of the cab 24 proximate the distal end 30, 32 of each of the upper and lower tubular support rails 18, 20. Preferably, a terminal portion 62 is provided on the ramp portion 56, 58 to position the bare exposed edge 42, 44 in parallel relationship with the aluminum body panel 14b. Preferably, the terminal portion 42, 44 is initially curved, as best shown in FIGS. 8 and 9.

The aforementioned corrosive conditions are avoided by providing the ramp portion 56, 58, and its terminal portion 62, 64 terminating in the bare exposed edge 42, 44, at the distal end 30, 32 of each of the hydroformed upper and lower tubular support rails 18, 20 and upon which the bare exposed edge 42, 44 is disposed. The bare exposed edge 42, 44 so configured is thus displaced from the adjacent aluminum panel 14b to form a gap G between the adjacent aluminum panel 14 and the bare exposed edge 42, 44 to prevent corrosion of the bare exposed edge 42, 44 without the use of adhesives and sealants, as shown in FIGS. 5-9.

Preferably, the initial curvature of the ramp portion 56, 58 begins roughly 5 mm from the bare exposed edge 42, 44, such that the gap G between the adjacent aluminum panel 14b and the bare exposed edge 42, 44 at the distal end 30, 32 of each of the upper and lower tubular support rails 18, 20 is no less than 3 mm from the aluminum body panel 14 and the ramp portion 56, 58 extends away from the aluminum body panel 14b at an angle of at least 30 degrees. The 3 mm separation between the bare exposed edge 42, 44 at the distal end 30, 32 of each of the upper and lower tubular support rails 18, 20 and the aluminum body panel 14b has been found to prevent water from creating a bridging effect due to capillary tension. Thus, the accumulation of water in the joint 70 is prevented. Without the presence of water in the joint 70, especially a joint made between dissimilar metals such as aluminum and steel, corrosion is minimized. Preferably, the ramp portion 56, 58 and its terminal portion 62, 64 are formed during the hydroformed process such that the aluminized coating proximate the bare exposed edge 42, 44 does not flake, scratch, scrape, or become otherwise damaged. Such shaping during the hydroforming process also enables for ease of trimming to the final shape of the bare exposed edge 42, 44 at the distal end 30, 32 of each of the upper and lower tubular support rails 18, 20.

In practice, the method of forming the joint 70 for a motor vehicle body disclosed herein comprises the steps of fabricating a body panel 14b from aluminum metal and fabricating the upper and lower tubular support rails 18, 20 from steel metal having an adjoining portion 52, 54 and a ramp portion 56, 58. The ramp portion preferably has a terminal portion 62, 64 terminating in a bare exposed edge 42, 44 on the upper and lower tubular support rails 18, 20 and upon which the bare exposed edge 42, 44 is disposed. Once fabricated, the aluminum body panel 14 and upper and lower tubular support rails 18, 20 may be attached to each other, with the adjoining portion 52, 54 of the upper and lower tubular support rails 18, 20 in substantially juxtaposed abutting relation with the aluminum body panel 14b when the upper and lower tubular support rails 18, 20 are attached to the aluminum body panel 14b and the bare exposed edge 42, 44 is displaced from the aluminum body panel 14b to form a gap G between the aluminum body panel 14b and the bare exposed edge 42, 44 to prevent corrosion of the bare exposed edge 42, 44 without the use of adhesives and sealants.

As a result of adoption of the joint of the present disclosure, the expense of additional sealers that would otherwise be used to prevent the galvanic action is eliminated. Further, no sealers, adhesives, patches, or secondary clip-on end caps are required. There is also no risk during the assembly process for accidental omission of the sealers or patches and the subsequent corrosion that might result. Further, the additional curvature of the steel structure provides improved design robustness. Finally, the elimination of seals or the need for any seals offers the elimination of the labor component cost during the assembly process.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A joint for a motor vehicle body comprising a first structural member fabricated from aluminum attached to a second structural member fabricated from steel and wherein the second structural member is a hydroformed tube, wherein the second structural member has an adjoining portion that is in substantially juxtaposed abutting relation with the first structural member, wherein the second structural member is attached to the first structural member and the second structural member has a ramp portion terminating in a bare exposed edge on the second structural member and upon which the bare exposed edge is disposed, the bare exposed edge being displaced from the first structural member to form a gap between the first structural member and the bare exposed edge to prevent corrosion of the bare exposed edge without the use of adhesives and sealants.

2. The motor vehicle body joint of claim 1, wherein the first structural member is a component of a motor vehicle body.

3. The motor vehicle body joint of claim 1, wherein the bare exposed edge is disposed on a terminal portion of the ramp portion at a distal end of the hydroformed tube.

4. The motor vehicle body joint of claim 3, wherein the hydroformed tube comprises aluminized coated high strength steel and the bare exposed edge is formed by cutting the hydroformed tube prior to attachment to the first structural member.

5. The motor vehicle body joint of claim 1, wherein the second structural member comprises a pair of a hydroformed tubes and wherein each of the pair of hydroformed tubes has a ramp portion terminating in a bare exposed edge that forms a distal end of the each of the pair of hydroformed tubes of the second structural member, the ramp portion of each of the pair of hydroformed tubes having a terminal portion displaced from the first structural member to form a gap between the first structural member and each of the bare exposed edges to prevent corrosion of the bare exposed edge without the use of adhesives and sealants.

6. The motor vehicle body joint of claim 5, wherein the pair of hydroformed tubes each form a substantially rectangular cross-sectional tube and each further comprise an adjoining portion that is in substantially juxtaposed abutting relation with the first structural member when the second structural member is attached to the first structural member and wherein each of the pair of hydroformed tubes is arranged in substantially juxtaposed abutting relation one to the other proximate the adjoining portion of each the hydroformed tubes.

7. The motor vehicle body joint of claim 6, wherein the first and second structural members each have at least one opening in alignment with one another and through which a threaded fastener extends to attach the first structural member to the adjoining portion of the second structural member.

8. The motor vehicle body joint of claim 1, wherein the gap prevents water accumulation in the joint arising from capillary action.

9. The motor vehicle body joint of claim 8, wherein the gap is at least 3 mm.

10. The motor vehicle body joint of claim 1, wherein the first structural member has a substantially planar portion and the adjoining portion of the second structural member is substantially co-planar with the first structural member and wherein the ramped portion terminates with a terminal portion that places the bare exposed edge in parallel relationship with the first structural member.

11. The motor vehicle body joint of claim 1, wherein the hydroformed tube forms a substantially rectangular cross-sectional tube and wherein the bare exposed edge is formed by cutting the hydroformed tube at an oblique angle relative to the tube prior to attachment to the first structural member.

12. The motor vehicle body joint of claim 11, wherein the oblique angle is about 45 degrees.

13. A joint comprising an aluminum member attached to a hydroformed tubular steel member in substantially juxtaposed abutting relation with the aluminum member, the steel member having a ramp portion terminating in a bare exposed edge, the bare exposed edge being displaced from the aluminum member to form a gap between the aluminum member and the bare exposed edge to prevent corrosion of the bare exposed edge without the use of adhesives and sealants.

14. The joint of claim 13, wherein said steel member further comprising aluminized coated high strength steel and wherein the bare exposed edge forms a distal end of the hydroformed tube and is formed by cutting the hydroformed tube prior to attachment to the aluminum member.

15. The joint of claim 13, wherein the ramp portion extends away from the aluminum member at an angle of at least 30 degrees.

16. The joint of claim 13, wherein the gap is at least 3 mm.

17. The joint of claim 14, wherein the hydroformed tube forms a substantially rectangular cross-sectional tube and wherein the bare exposed edge is formed by cutting the hydroformed tube at an oblique angle relative to the tube prior to attachment to the aluminum member.

18. A method of forming a joint for a motor vehicle body, the method comprising the steps of:
fabricating a first structural member from aluminum metal;
fabricating a second structural member from steel metal having an adjoining portion and a ramp portion terminating in a bare exposed edge on the second structural member and upon which the bare exposed edge is disposed and wherein the second structural member is a hydroformed tube; and
attaching the second structural member to the first structural member, wherein the adjoining portion of the second structural member is in substantially juxtaposed abutting relation with the first structural member when the second structural member is attached to the first structural member and the bare exposed edge is displaced from the first structural member to form a gap between the first structural member and the bare exposed edge to prevent corrosion of the bare exposed edge without the use of adhesives and sealants.

19. A method of claim 18, wherein said hydro formed tube forms a substantially rectangular cross-sectional tube, the method further comprising the step of forming the hydroformed tube with the ramp portion at a distal edge thereof, the ramp portion having a terminal portion upon which the bare exposed edge is disposed.

20. The method of claim 18, wherein the gap is at least 3 mm.

* * * * *